United States Patent
Barzik et al.

(10) Patent No.: US 10,469,288 B2
(45) Date of Patent: Nov. 5, 2019

(54) EFFICIENT DATA TRANSFER IN REMOTE MIRRORING CONNECTIVITY ON SOFTWARE-DEFINED STORAGE SYSTEMS

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Demian Glait, Hod Hasharon (IL); Maxim Kalaev, Petach Tikva (IL); Rivka M. Matosevich, Zichron-Ya'acov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 15/340,091

(22) Filed: Nov. 1, 2016

(65) Prior Publication Data

US 2018/0123833 A1    May 3, 2018

(51) Int. Cl.
| | |
|---|---|
| *H04L 12/931* | (2013.01) |
| *H04L 12/66* | (2006.01) |
| *H04L 29/08* | (2006.01) |
| *H04N 21/218* | (2011.01) |
| *H04N 19/433* | (2014.01) |

(Continued)

(52) U.S. Cl.
CPC .............. *H04L 12/66* (2013.01); *H04L 45/64* (2013.01); *H04L 49/356* (2013.01); *H04L 67/1095* (2013.01); *H04N 19/433* (2014.11); *H04N 21/2182* (2013.01); *H04N 21/21815* (2013.01); *H04L 67/1097* (2013.01); *H04N 21/2747* (2013.01); *H04N 21/432* (2013.01); *H04N 21/4435* (2013.01)

(58) Field of Classification Search
CPC ............. H04L 29/08549; H04L 49/356; H04L 67/1097; H04L 29/08729; H04L 49/9078; H04N 21/2747; H04N 21/432; H04N 21/21815; H04N 21/4435; H04N 21/2182; H04N 19/433
See application file for complete search history.

(56) References Cited

U.S. PATENT DOCUMENTS 7,647,460 B1 * 1/2010 Wilson ................ G06F 11/2071
                                                       711/162
8,195,770 B1 * 6/2012 Aral .................... G06F 11/2064
                                                       709/217

(Continued)

OTHER PUBLICATIONS

Wilton, Steve, "Implementing Logic in FPGA Memory Arrays: Heterogeneous Memory Architecures", IEEE; Mar. 26, 2003, pp. 142-147 (Year: 2003).*

(Continued)

*Primary Examiner* — Salvador E Rivas
(74) *Attorney, Agent, or Firm* — Griffiths & Seaton PLLC (57) ABSTRACT

Embodiments for network management in a Software-defined Storage (SDS) environment. Remote mirroring connectivity and data transfer is optimized in the SDS environment by establishing each of a plurality of nodes in a local storage array and a remote storage array as a gateway node. Data residing on a local gateway node is transferred directly to a remote gateway node owning the data, thereby avoiding interconnect data hops and improving datacenter network utilization.

18 Claims, 5 Drawing Sheets

(51) Int. Cl.
  *H04L 12/715* (2013.01)
  *H04N 21/443* (2011.01)
  *H04N 21/432* (2011.01)
  *H04N 21/2747* (2011.01)

(56) References Cited

U.S. PATENT DOCUMENTS

| | | | |
|---|---|---|---|
| 2003/0161331 A1* | 8/2003 | Ochi | H04L 29/06 370/400 |
| 2012/0254462 A1* | 10/2012 | Sengupta | G06F 11/2071 709/238 |
| 2014/0201425 A1 | 7/2014 | Clark et al. | |
| 2015/0006663 A1 | 1/2015 | Huang | |

OTHER PUBLICATIONS

Internet Society RFCS et al., "Framework and Requirements for an Access Node Control Mechanism in Broadband Multi-Service Network," An IP.com Prior Art Database Technical Disclosure, IP.com No. 00019582, May 1, 2010 (95 pages).

Internet Society RFCS et al. , "Proactive Connectivity Verification, Continuity Check, and Remote Defect Indication for the MPLS Transport Profile," An IP.com Prior Art Database Technical Disclosure, IP.com No. 000213117, Nov. 1, 2011 (43 pages).

* cited by examiner

EFFICIENT DATA TRANSFER IN REMOTE MIRRORING CONNECTIVITY ON SOFTWARE-DEFINED STORAGE SYSTEMS

BACKGROUND OF THE INVENTION

Field of the Invention

The present invention relates in general computing systems, and more particularly to, various embodiments for network connectivity management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for network management in a Software-defined Storage (SDS) environment, by a processor are provided. In one embodiment, by way of example only, a method comprises optimizing remote mirroring connectivity and data transfer in the SDS environment by establishing each of a plurality of nodes in a local storage array and a remote storage array as a gateway node; wherein data residing on a local gateway node is transferred directly to a remote gateway node owning the data, thereby avoiding interconnect data hops and improving datacenter network utilization.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

A distributed data storage system typically comprises cache memories that are coupled to a number of disks wherein the data is permanently stored. The disks may be in the same general location, or be in completely different locations. Similarly, the caches may be localized or distributed. The storage system is normally used by one or more hosts external to the system.

Using more than one cache and more than one disk leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system.

While distribution of the storage elements has undoubted advantages, the fact of the distribution typically leads to increased overhead compared to a local system having a single cache and a single disk. Inter alia, the increased overhead is required to manage the increased number of system components, to equalize or attempt to equalize usage of the components, to maintain redundancy among the components, to operate a backup system in the case of a failure of one of the components, and to manage addition of components to, or removal of components from, the system. A reduction in the required overhead for a distributed storage system is desirable.

Software-defined Storage (SDS) is a computer data storage technology that separates storage hardware from the software that manages the storage infrastructure. By definition, SDS software is separate from the hardware it is managing.

Grid storage, as eluded to previously, is a computer data storage technology that stores data using multiple self-contained interconnected storage nodes (i.e., servers), so that any node can communicate with any other node without the data having to pass through a centralized node.

One advantage of grid storage systems is that its data distribution scheme offers a level of load balancing, fault-tolerance and redundancy across the system. It implies that if one storage node fails or if a pathway between two nodes is interrupted, the network can reroute data access via a different path or to a redundant node. In operation, SDS can implement a grid storage system to span data across multiple servers. That is, SDS storage systems are typically "scale out", or in other words comprise of a set of servers which make up a cluster which, when viewed externally, presents a single storage system.

In SDS, the backbone of the interconnect between the servers which makes up the system may be the data center networking. An SDS system may be made up of a number of servers working together as a cluster and connected by the interconnect. Each server in an SDS system may have certain software modules. In particular it may have an interface module which handles input/output (I/O) requests which are routed to the correct data module or node, according to the data distribution; a data module which is responsible for managing the data (i.e. store and retrieve the data and ensure consistency) where each data module "owns" part of the data managed by the storage system; and a gateway module or node which is responsible for sending data to a remote system when mirroring or migration techniques are employed.

At the same time, disaster recovery systems typically address a sudden catastrophic failure at a single point in time. To assist in recovery of data, a copy of data may be provided at a remote location. Such dual or shadow copies are typically made as the application system is writing new data to a primary storage device. Different copy technologies well known to those skilled in the art may be used for maintaining remote copies of data at a secondary site.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. The integrity of data updates is related to insuring that updates are done at the secondary volumes in the volume pair in the same order as they were done on the primary volume.

Many storage arrays support a solution for remote mirroring. The remote mirroring solutions often rely on Fibre or Internet Small Computer System Interface (iSCSI) connectivity between the local and remote arrays, over which the mirrored data is sent from the local array to the remote array. In some implementations, the local array appears like another host to the remote array and the data sent from the local array to the remote array appears as writes from a host.

The connectivity between the local and remote arrays is usually limited to a small number of links between the two arrays. Thus, in a grid storage array, the outcome of having this limited connectivity between the local and remote arrays means that the data typically does not reside in the node from which it is sent nor received on the node it will ultimately reside. For example, in a 15 node system with a single node serving as a gateway, the likelihood of the data to be sent being local to (i.e. residing on) the gateway node is $1/15$. When data from another node needs to be sent, that is in the other $14/15$ of the cases, the data then must be transferred from the owning node to the gateway node and its location over the interconnect. The same principle is true for the receiving (remote) node, in which often times the data must be received at the gateway node and transferred to the receiving node owning the data (i.e. the node on which the data will ultimately reside). This additional interconnect hop in each side of the relationship adds both latency to the I/O operations, and even more significantly, increases the overall load on the system and the interconnect backchannel.

Accordingly, to improve upon the art, the mechanisms of the present invention implement such functionality as establishing all nodes (both in the local storage array and the remote storage array) as gateway nodes, where data may be routed directly from the node holding the data on the local system to the node that will hold the data on the remote system.

The mechanisms illustrated below may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Figure 1:
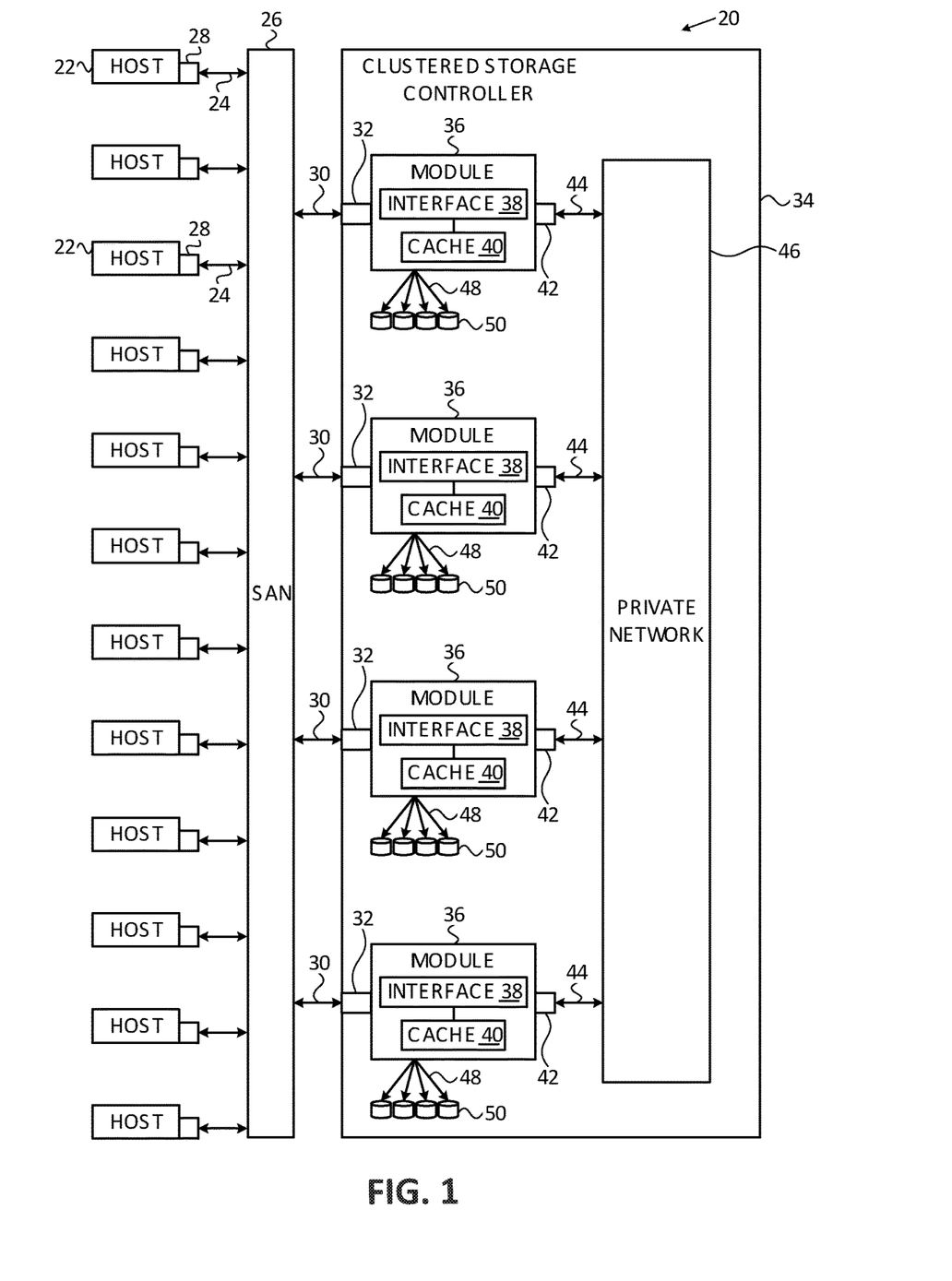
FIG. 1 illustrates a block diagram of a computer storage environment in which aspects of the present invention may be realized.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
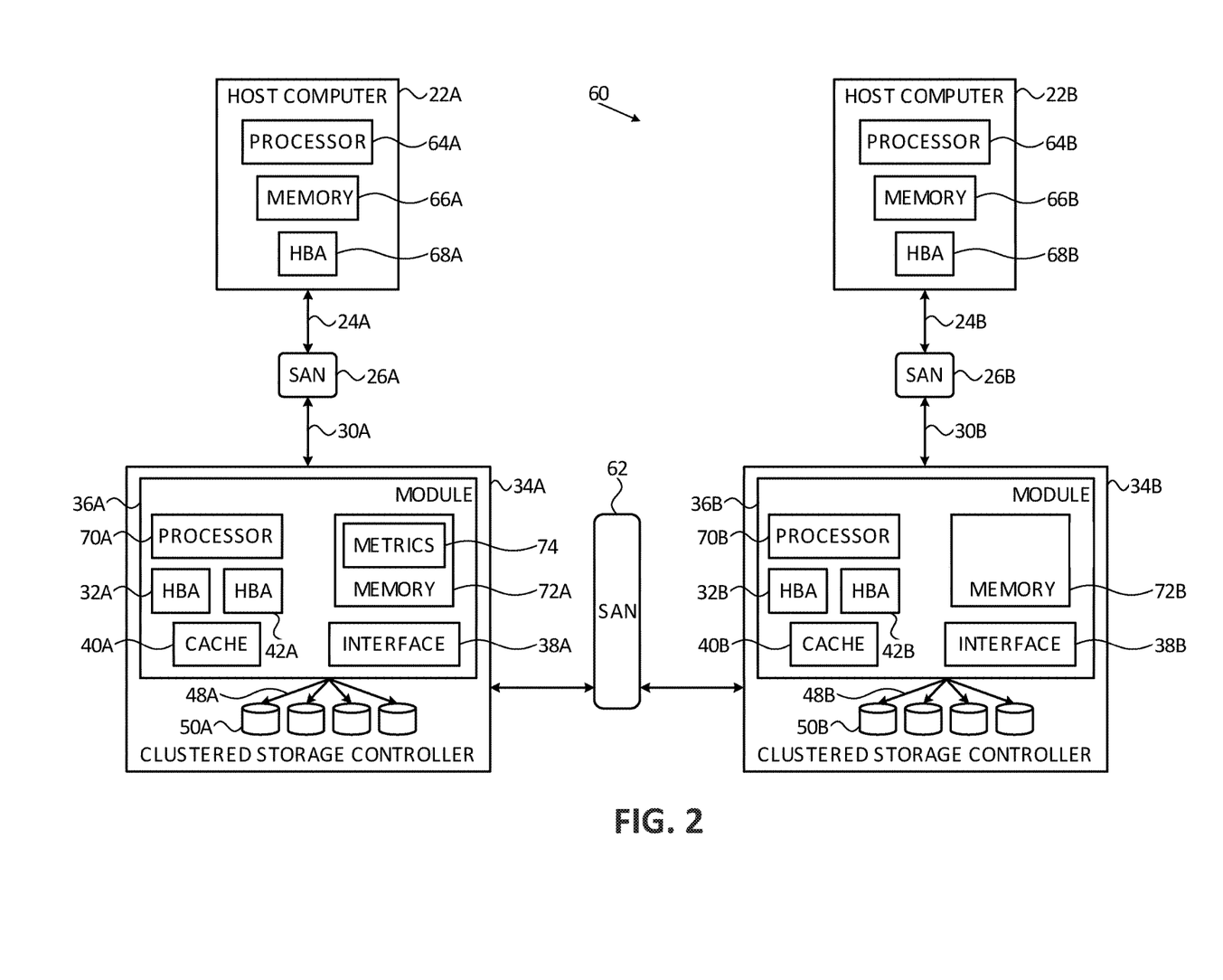
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium. The coupling of the clustered storage controller 34A and clustered storage controller 34B via SAN 62 enables the establishment of a variety of storage techniques including disaster recovery (DR) techniques. As will be further described herein, such coupling provides the back-end infrastructure needed for the establishment of data mirroring operations between the clustered storage controllers 34A/34B (and likewise between first host computer 22A and second host computer 22B interconnected between clustered storage controllers 34A/34B), or otherwise a host of related DR operations as commonly known in the art.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
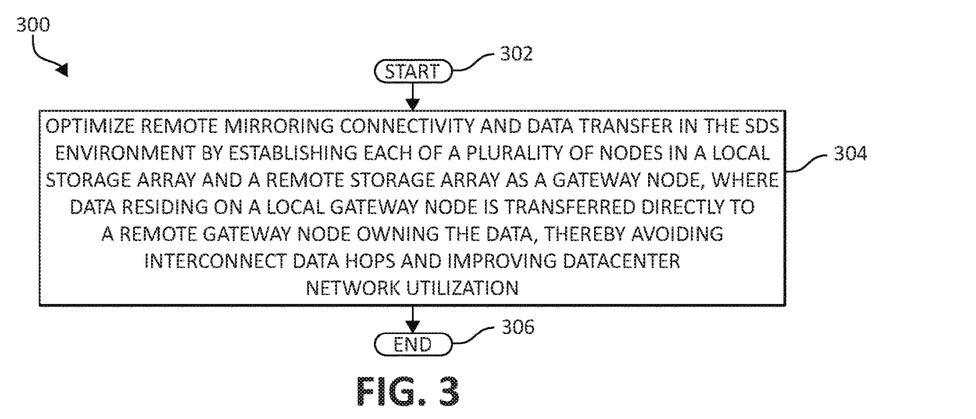
FIG. 3 illustrates a flowchart diagram illustrating an exemplary method for network management in a Software-defined Storage (SDS) environment by a processor, by which aspects of the present invention may be implemented.

Continuing, FIG. 3 illustrates a method 300 for network management in an SDS environment, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The method 300 begins (step 302) by optimizing remote mirroring connectivity and data transfer in the SDS environment by establishing each of a plurality of nodes in a local storage array and a remote storage array as a gateway node. Data residing on a local gateway node is transferred directly to a remote gateway node owning the data, thereby avoiding interconnect data hops and improving datacenter network utilization (step 304). The method 300 ends (step 306).

As aforementioned, the present invention implements functionality to establish all nodes (both in a local storage array and a remote storage array) as gateway nodes, where data may be routed directly from the node holding the data on the local system to the node that will hold the data on the remote system. The mechanisms of the present invention thereby, by employing a "direct" connection to mirror data, significantly reduce I/O latency and overall load of the storage array systems and interconnect back-channels by avoiding sending data through unnecessary interconnect hops in both the source-side and target-side of the data transfer.

As will be discussed further, upon defining a mirroring configuration between a source and a target system, once a connection has been established between the source and target systems, each node connected thereto may be used as a gateway to send and/or receive data. Data which must be sent pursuant to the mirroring operation may thereby be identified as residing on a local gateway node within the local storage array. Information of the data distribution on the remote storage array is then used by the local gateway node to determine which remote gateway node in which to send the data, that is, the remote node on which the data will ultimately reside. Using the information and the established connection, the data is then sent through the local gateway node directly to the remote gateway node.

Figure 4:
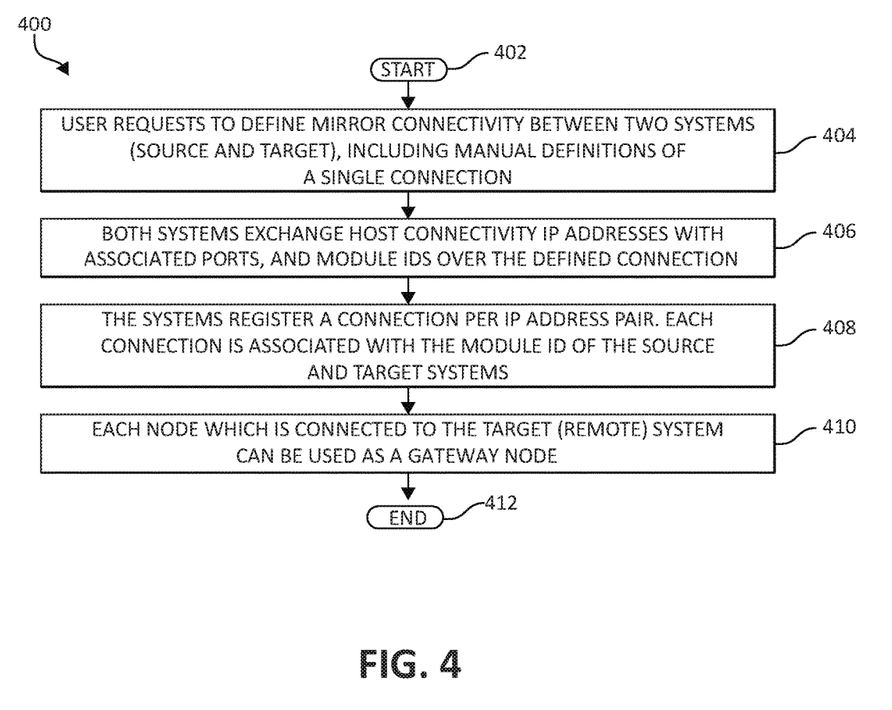
FIG. 4 illustrates an additional flowchart diagram illustrating an exemplary method network management in an SDS environment by a processor, by which aspects of the present invention may be implemented.

FIG. 4 illustrates a method 400 for network management in an SDS environment, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Specifically, the method 400 illustrates the connectivity establishment as part of configuring the mirroring operations employed herein. The method 400 begins (step 402) by receiving a request by a user to define mirror connectivity between two systems (a source system in a source storage array and a target system in a target storage array), including manual definitions of a single connection (step 404). The source system and the target system exchange their host connectivity Internet Protocol (IP) addresses with associated ports thereof and module identifications (IDs) over the connection defined by the user. This connectivity definition and exchange may utilize vendor-specific Small Computer System Interface (SCSI) commands (step 406).

The source system and the target system use this connectivity to register a connection per IP address pair, where each connection is associated with the module ID of each of the source and target systems (step 408). Using this functionality, up to a full mash connectivity between the local and remote systems may be automatically defined, depending on hardware and/or network availability (i.e. a configured path exists between any server in local storage system to any server in the remote storage system). Upon establishing the connectivity, each node which is connected to the target (remote) system may be used as a gateway node (step 410). The method 400 ends (step 412).

Figure 5:
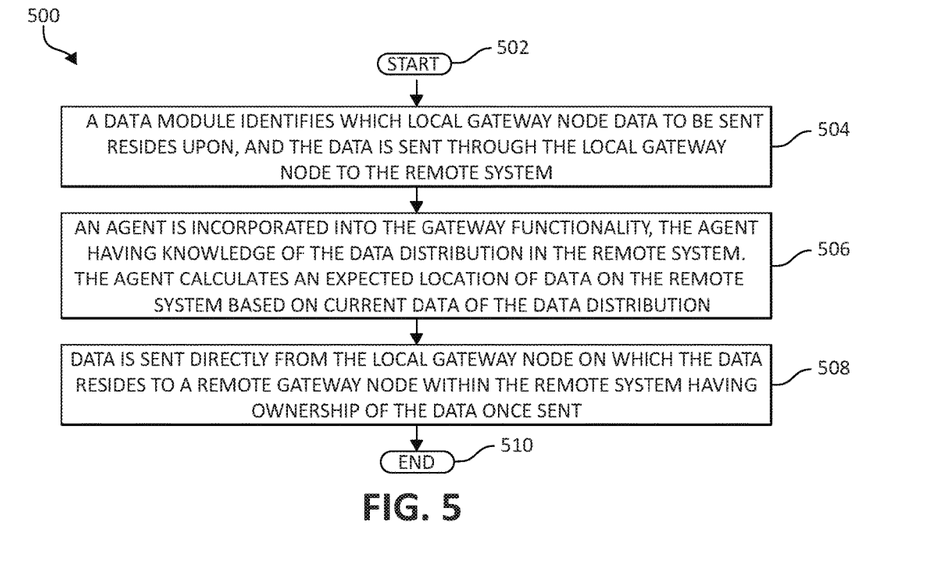
FIG. 5 illustrates an additional flowchart diagram illustrating an exemplary method network management in an SDS environment by a processor, by which aspects of the present invention may be implemented.

Advancing, FIG. 5 illustrates a method 500 for network management in an SDS environment, in accordance with one embodiment of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) when data must be sent to the remote system pursuant to the mirroring operation, the data being sent through the local gateway (if one exists). A data module confirms a local gateway node exists and identifies the local gateway node data to be sent resides upon. Upon making this determination, the data is sent through the local gateway node to the remote system (step 504).

The gateway functionality includes the use of a gateway agent where the agent has knowledge of information concerning the data distribution within the remote system. The agent functionality may be performed by a computer program having computer code, a hardware component, or a combination thereof. This agent functionality enables the local gateway node to send the data directly to the remote gateway node which owns the data, provided the remote gateway node is connected to the local gateway node. This is accomplished because the gateway node includes Heterogeneous System Architecture (HSA) functionality for each remote target array. As will be further described in FIG. 6, the agent periodically (e.g. over a predetermined time period or at predetermined intervals) updates the information about the data distribution within the remote system, including the remote array volume offsets and slice table (step 506). The agent calculates the expected location of the data to be sent on the remote system, based on current data distribution data (pursuant to the periodic updates). The information of the data distribution of the remote target array is thus used to identify the remote gateway node having ownership of the data once sent and send the data from the local gateway node to the identified remote gateway node (step 508). The method 500 ends (step 510).

Because of the increase in number of gateway nodes in the arrays, in some embodiments, a traffic manager component may be used which is capable of enforcing efficient data rate limiting over a set of source gateway nodes and associated ports. The data rate limiting may be associated with a predetermined restriction on bandwidth usage, a specific amount or size of data being sent, or other factors. For example, in a system where the number of nodes are symmetric, the rate limiting policy could be defined as dividing the total available bandwidth rate by the number of gateway nodes, and assigning each node an equal portion of the total available rate. This traffic manager may be implemented as an application or otherwise computer code, a hardware component, or a combination thereof.

Figure 6:
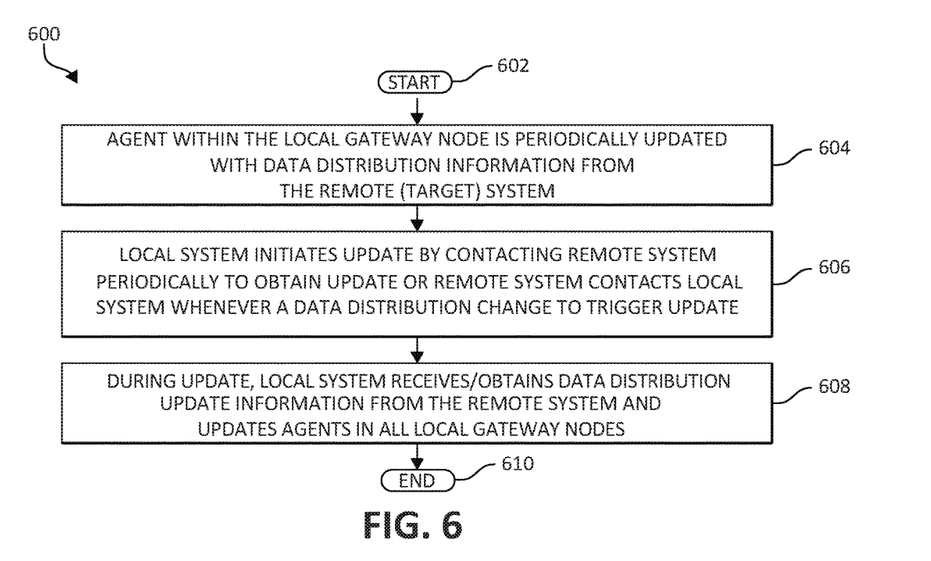
FIG. 6 illustrates still an additional flowchart diagram illustrating an exemplary method network management in an SDS environment by a processor, by which aspects of the present invention may be implemented.

Concluding, FIG. 6 illustrates a method 600 for network management in an SDS environment, in accordance with one embodiment of the present invention. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Specifically, the method 600 illustrates a method for updating the gateway agent regarding the data distribution on the remote system, as previously discussed. The method 600 begins (step 602) by, here again, updating information within the agent regarding the current data distribution of the remote (target) system (step 604). In one embodiment, the information is periodically updated pursuant to a predetermined time interval or time period. The local system may initiate an update and contact the remote system to retrieve the information regarding the data distribution of the remote system. In other embodiments, the remote system may contact the local system whenever a change occurs to the data distribution information within the remote system (step 606). In either embodiment, during the update, the local system either receives or obtains the information regarding the data distribution on the remote system and updates the agents in all local gateway nodes (step 608). The method 600 ends (step 610).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for network management in a Software-defined Storage (SDS) environment, by a processor, comprising:
    configuring the SDS to implement a grid storage comprised of first multiple respective servers comprising a first plurality of nodes in a local storage array and second multiple respective servers comprising a second plurality of nodes at a remote storage array;
    wherein data is distributed among the first and second plurality of nodes comprising the grid storage;
    establishing each of the first plurality of nodes in the local storage array and the second plurality of nodes in the remote storage array as a gateway node;
    wherein data residing on a local gateway node comprising any one node of the first plurality of nodes is transferred directly to a remote gateway node comprising any one node of the second plurality of nodes which owns the data, thereby avoiding interconnect data hops and improving datacenter network utilization; and
    using, on the local gateway node, an agent having information of a data distribution within the remote storage array, the agent calculating, according to the data distribution, an expected location including which one of the plurality of nodes within the remote storage array the data is to be sent prior to sending the data;
    wherein the calculating further includes identifying data rate limitations on ports of the first plurality of nodes, the data rate limitations including respective predetermined restrictions of bandwidth usage and an amount of the data to be sent from the local gateway node; and
    wherein the local gateway node incorporates Heterogeneous System Architecture (HSA) functionality for the remote storage array.

2. The method of claim 1, further including issuing, by a user, a request to define mirror connectivity between the local storage array and the remote storage array; and
    exchanging, by each of the local storage array and the remote storage array, an Internet Protocol (IP) address with an associated port, and a module identification (ID).

3. The method of claim 2, further including registering, by the local storage array and the remote storage array, a connection per IP address pair; wherein the connection is associated with the module ID of both the local storage array and the remote storage array.

4. The method of claim 1, further including, upon receiving a request to transfer data, identifying, by a cache node, the local gateway node within the local storage array on which the data resides.

5. The method of claim 1, further including periodically updating, by the agent, the information of the data distribution within the remote storage array including volume offsets and a slice table.

6. The method of claim 5, further including using the information to identify the remote gateway node within the remote storage array owning the data.

7. A system for network management in a Software-defined Storage (SDS) environment, the system comprising:
    one or more computers, each of the one or more computers having a processor, wherein the processor:
    configures the SDS to implement a grid storage comprised of first multiple respective servers comprising a first plurality of nodes in a local storage array and second multiple respective servers comprising a second plurality of nodes at a remote storage array;
    wherein data is distributed among the first and second plurality of nodes comprising the grid storage;

establishes each of the first plurality of nodes in the local storage array and the second plurality of nodes in the remote storage array as a gateway node;

wherein data residing on a local gateway node comprising any one node of the first plurality of nodes is transferred directly to a remote gateway node comprising any one node of the second plurality of nodes which owns the data, thereby avoiding interconnect data hops and improving datacenter network utilization; and uses, on the local gateway node, an agent having information of a data distribution within the remote storage array, the agent calculating, according to the data distribution, an expected location including which one of the plurality of nodes within the remote storage array the data is to be sent prior to sending the data;

wherein the calculating further includes identifying data rate limitations on ports of the first plurality of nodes, the data rate limitations including respective predetermined restrictions of bandwidth usage and an amount of the data to be sent from the local gateway node; and wherein the local gateway node incorporates Heterogeneous System Architecture (HSA) functionality for the remote storage array.

8. The system of claim 7, wherein the processor issues, by a user, a request to define mirror connectivity between the local storage array and the remote storage array; and exchanges, by each of the local storage array and the remote storage array, an Internet Protocol (IP) address with an associated port, and a module identification (ID).

9. The system of claim 8, wherein the processor registers, by the local storage array and the remote storage array, a connection per IP address pair; wherein the connection is associated with the module ID of both the local storage array and the remote storage array.

10. The system of claim 7, wherein the processor, upon receiving a request to transfer data, identifies, by a cache node, the local gateway node within the local storage array on which the data resides.

11. The system of claim 7, wherein the processor periodically updates, by the agent, the information of the data distribution within the remote storage array including volume offsets and a slice table.

12. The system of claim 11, wherein the processor uses the information to identify the remote gateway node within the remote storage array owning the data.

13. A computer program product for network management in a Software-defined Storage (SDS) environment, by a processor, the computer program product embodied on a non-transitory computer-readable storage medium having computer-readable program code portions stored therein, the computer-readable program code portions comprising:

an executable portion that configures the SDS to implement a grid storage comprised of first multiple respective servers comprising a first plurality of nodes in a local storage array and second multiple respective servers comprising a second plurality of nodes at a remote storage array;

wherein data is distributed among the first and second plurality of nodes comprising the grid storage;

an executable portion that establishes each of the first plurality of nodes in the local storage array and the second plurality of nodes in the remote storage array as a gateway node;

wherein data residing on a local gateway node comprising any one node of the first plurality of nodes is transferred directly to a remote gateway node comprising any one node of the second plurality of nodes which owns the data, thereby avoiding interconnect data hops and improving datacenter network utilization; and an executable portion that uses, on the local gateway node, an agent having information of a data distribution within the remote storage array, the agent calculating, according to the data distribution, an expected location including which one of the plurality of nodes within the remote storage array the data is to be sent prior to sending the data;

wherein the calculating further includes identifying data rate limitations on ports of the first plurality of nodes, the data rate limitations including respective predetermined restrictions of bandwidth usage and an amount of the data to be sent from the local gateway node; and wherein the local gateway node incorporates Heterogeneous System Architecture (HSA) functionality for the remote storage array.

14. The computer program product of claim 13, further including an executable portion that issues, by a user, a request to define mirror connectivity between the local storage array and the remote storage array; and an executable portion that exchanges, by each of the local storage array and the remote storage array, an Internet Protocol (IP) address with an associated port, and a module identification (ID).

15. The computer program product of claim 14, further including an executable portion that registers, by the local storage array and the remote storage array, a connection per IP address pair; wherein the connection is associated with the module ID of both the local storage array and the remote storage array.

16. The computer program product of claim 13, further including an executable portion that, upon receiving a request to transfer data, identifies, by a cache node, the local gateway node within the local storage array on which the data resides.

17. The computer program product of claim 13, further including an executable portion that periodically updates, by the agent, the information of the data distribution within the remote storage array including volume offsets and a slice table.

18. The computer program product of claim 17, further including an executable portion that uses the information to identify the remote gateway node within the remote storage array owning the data.

* * * * *